Sept. 2, 1958 R. N. DOLPHIN 2,850,286

RECORD-PLAYING APPARATUS

Filed May 25, 1954 4 Sheets-Sheet 1

INVENTOR
Robert Neil Dolphin
Ralph Burch
Attorney

INVENTOR
Robert Neil Dolphin
Ralph B. Burch
Attorney

INVENTOR
Robert Neil Dolphin
Ralph Burch
Attorney

Sept. 2, 1958 R. N. DOLPHIN 2,850,286

RECORD-PLAYING APPARATUS

Filed May 25, 1954 4 Sheets-Sheet 4

INVENTOR
Robert Neil Dolphin
Ralph Burch
Attorney 2,850,286

RECORD-PLAYING APPARATUS

Robert Neil Dolphin, Vancouver, British Columbia, Canada

Application May 25, 1954, Serial No. 432,234

3 Claims. (Cl. 274—15)

The subject matter of this disclosure concerns improvements in record-playing apparatus of the type used with music-vending systems, and is particularly concerned with novel arrangements permitting a number of separate reproductions of a recorded performance to be produced from each record disc.

In apparatus according to the invention each turntable has associated therewith a number of pickup arms bearing reproduction heads of the type used with disc records, each reproducer being selectable separately to initiate a reproduction of a recorded performance. The invention provides apparatus incorporating a number, which may be ten or more, of pickup arms and actuating mechanisms for raising and lowering the stylus of each head with respect to the surface of a record. Means are also provided for the initiation of a reproduction from one or more remote points, and for the automatic termination of a reproduction.

The music-vending systems currently in public use are generally restricted as to the number of record selections offered, and will allow but one reproduction at a time to be performed from a given disc. Consequently the patrons at a location served by an automatic record-playing system have restricted availability of performances, particularly where individual performances are selected by and reproduced for a patron. A customer must either wait until a desired performance is finished and the record available for his selection, or he must accept a performance which is already in progress. It is the purpose of the invention to provide a system whereby a much larger effective record stock is available for individual reproduction of performances to a patron, permitting numbers of simultaneous but separately initiated performances from each record to be provided on request.

It will be shown hereinafter how effective multiplication of a record stock may be achieved without physically duplicating the entire record stock for each vending outlet, and also how simple and economical accessories may be constructed for use with turntable to allow a number of performances to be reproduced from a single record disc.

It is a further purpose of the invention to show the manner in which large groups of turntables and their associated mechanism and pickup heads may be housed to provide ease of maintenance and economy of equipment.

It is also intended by this disclosure to show the construction of turntable mechanism and to pickup arms, pickup cartridge carriers, raising and lowering mechanism, and control circuitry for starting and stopping, the whole forming a description of preferred embodiments of the invention.

The purposes and objects indicated above, and other objects and purposes not specifically stated but which may become apparent, may be understood by a careful reading of the following description together with a study of the figures of drawing accompanying and forming part of this disclosure.

Figures 3, 4, 5:
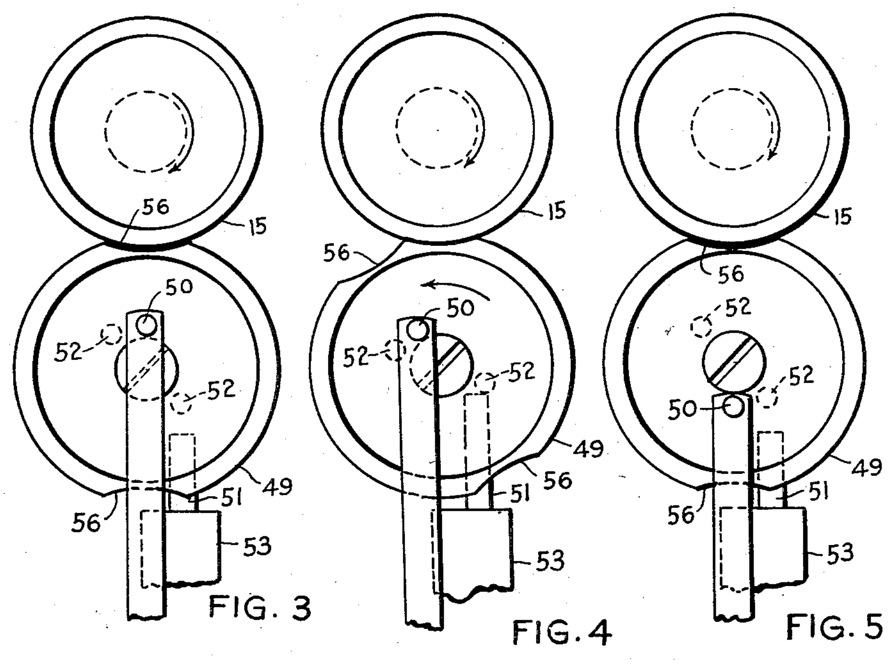

Figures 3, 4, and 5 illustrate in plan view the phases of a cycle of operations concerned with the raising and lowering of a pickup arm.

Figures 6, 7, 8, 9:
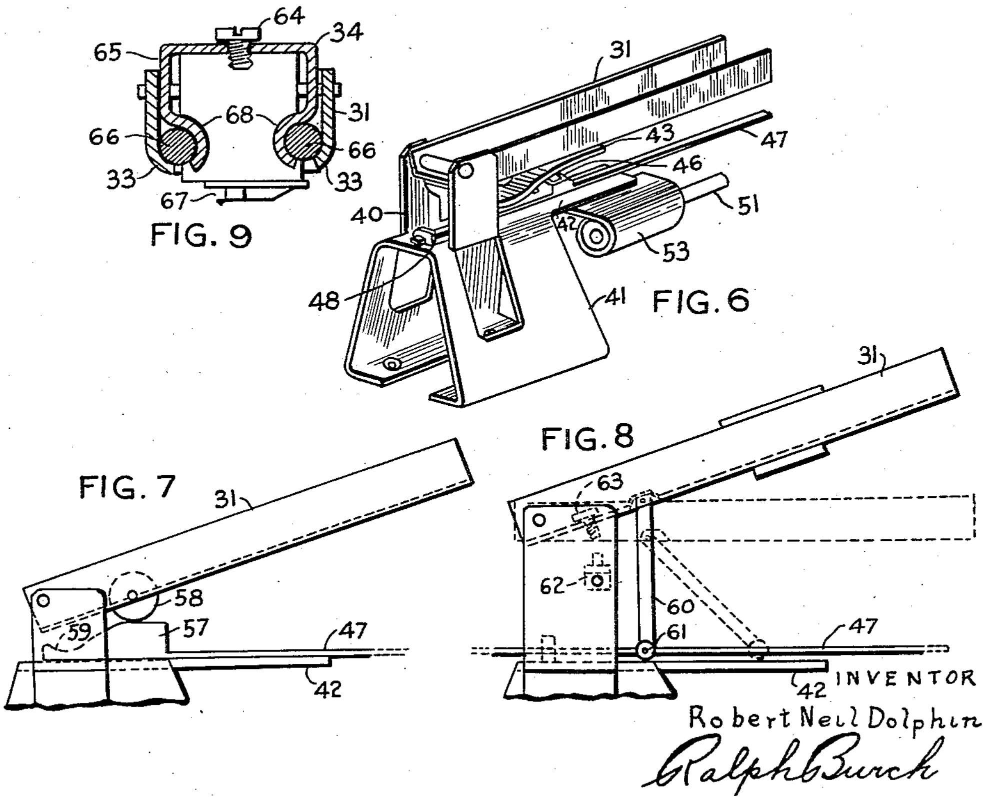

Figure 6 is a perspective illustration of the mounting for a pickup arm, lifting cam, and actuating solenoid.

Figures 7 and 8 illustrate alternative lifting devices for raising and lowering pickup arms.

Figure 9 is a view in section of a carriage for holding a reproducer cartridge in the pickup arm.

Figure 10:
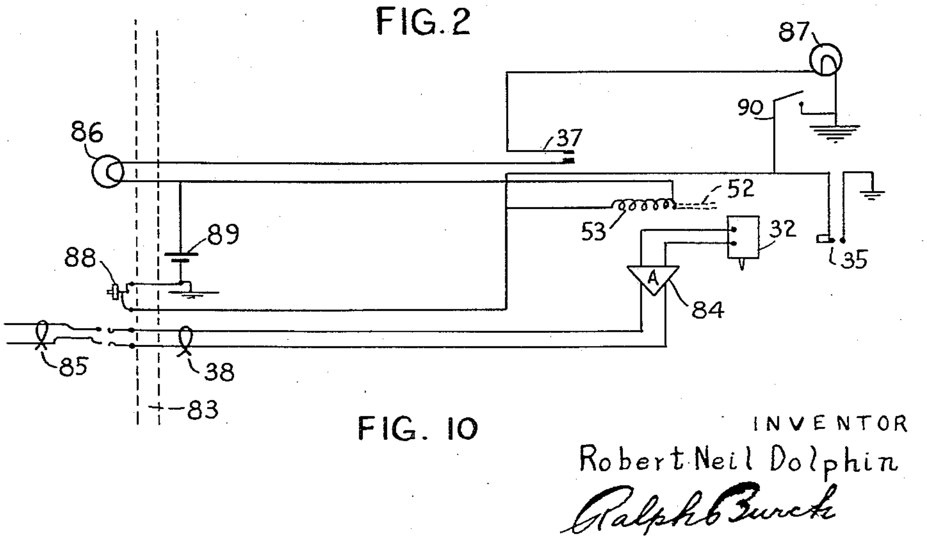

Figure 10 is a schematic circuit of one form of control system which may be used with each pickup arm and its associated reproducer channel.

Figure 11:
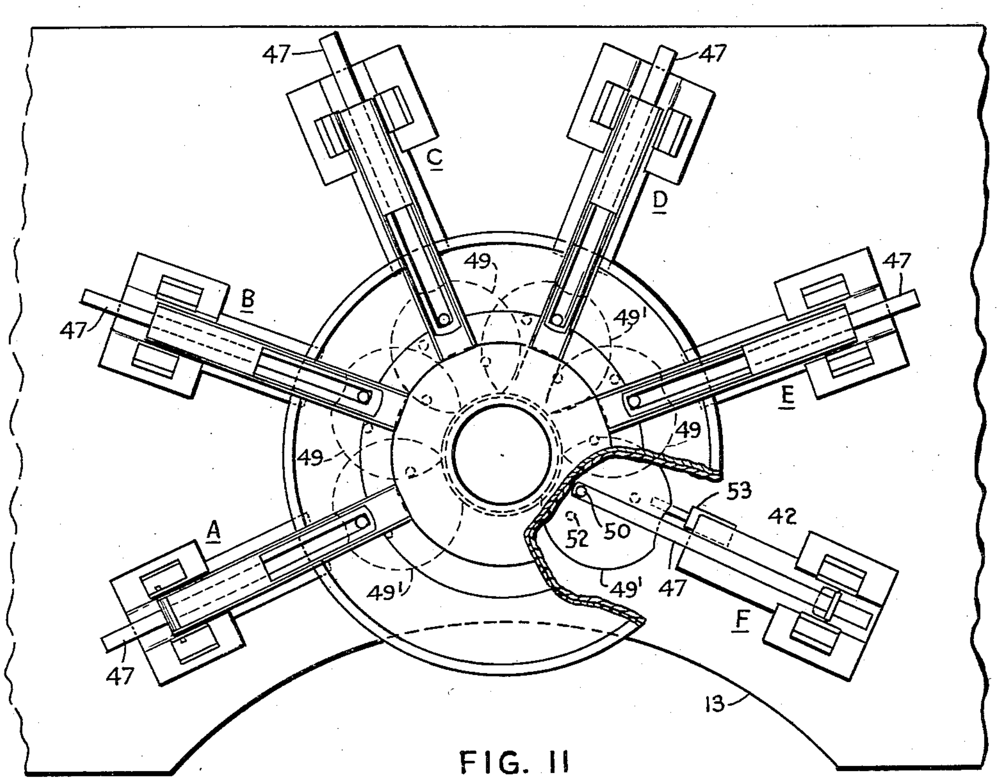

Figure 11 shows an arrangement of six pickup arms about a turntable for a 45 R. P. M. record disc.

Figures 12, 13:
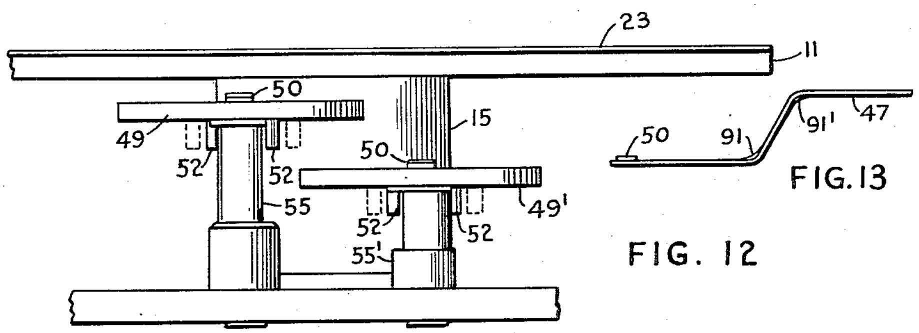

Figure 12 shows an arrangement for vertically staggering actuating friction wheels about a drive wheel.

Figure 13 shows a modification of a link member forming part of a pickup-arm actuating mechanism.

Figure 14:
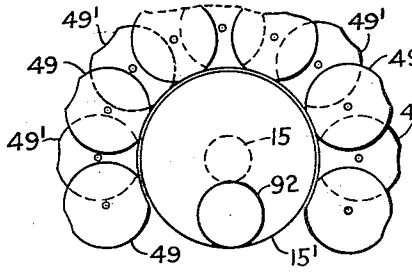

Figure 14 illustrates a choice of wheel ratios useful with a system providing a larger number of pickup arms per disc.

Figure 1:
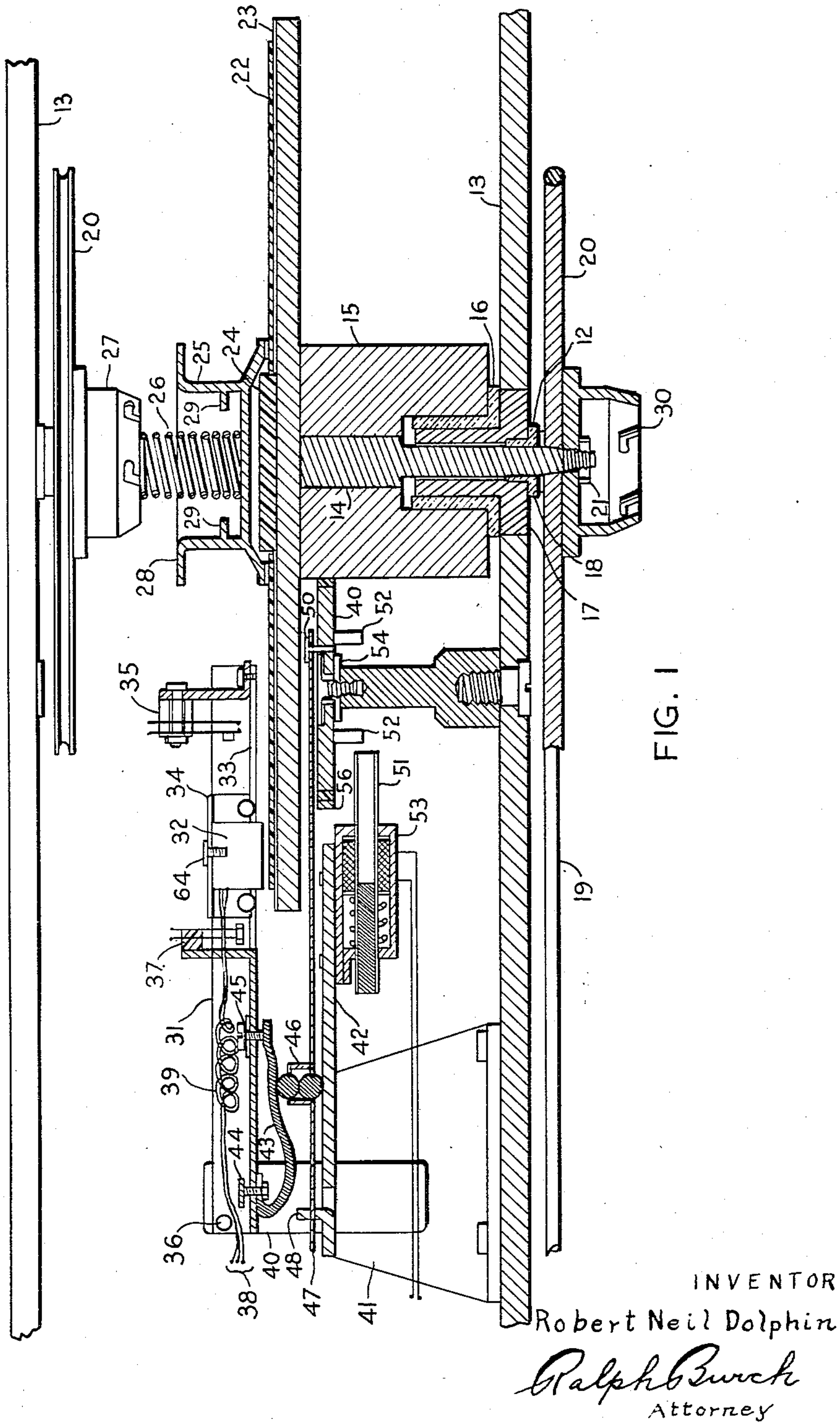
Figure 1 is an elevation view in section of a turntable and associated pickup arm with its related devices, the figure illustrating one deck of a vertically-ganged stack of turntables.

In Figure 1 a turntable 11 rotates about a bearing system 12 supported by a base plate 13. Shaft 14 which may be of steel is pressed into a bore in drive member 15, to which turntable 11 is fastened by any suitable means. A sleeve bearing 16 of the type comprising a porous molded metal body carrying its oil supply, serves as a thrust bearing and to support the turntable. Hardened steel stationary bearing 17 is firmly held in base plate 13, as by being inserted as a force fit into a bore prepared in the plate. Stationary sleeve 18 is further provided to ensure freedom from wobble or wow in the turntable, by restraining shaft 14 against other than rotational movement.

Drive to the turntable is provided by a belt 19 from a drive pulley to rotate pulley 20 which is secured to shaft 14. The latter is provided with a tapered shoulder which engages a corresponding taper in pulley 20, and a threaded end portion by which nut 21 secured the pulley to the shaft.

A record disc 22 is supported on the upper surface of table 11, resting on a pad of suitable friction material 23. Depending on the type of record, a central boss 24 is provided for centering the record with respect to the axis of rotation, the figure illustrating an arrangement for the standard 45 R. P. M. type of disc by way of example. Further support and restraint for the disc is provided by member 25 which is pressed against the inner portion thereof by spring 26, which bears against the cup-shaped member 27 forming part of a similar equipment of a deck above. Member 25 has a ring of rubber or other suitable material affixed to its lower surface to provide uniform distribution of pressure. Flange 28 is provided to enable lifting of member 25 by two fingers, and pins 29 are provided to permit the member to be held in a raised position by entering slots 30 of part 27. The record is thereby freed to allow its removal. On replacement of a disc, a small twist of member 25 releases it from its raised position whereupon it may be lowered to the record surface.

Pickup arm 31 supports the pickup cartridge 32, here illustrated in playing relation with disc 22. In its operating position the ways 33 are horizontal and parallel with the record surface. Cartridge 32 is held in a carriage 34 which is freely slidable along the ways 33 formed in the arm longitudinally thereof, the cartridge being substantially free of restraint vertically when in normal playing position, so that the pressure of the stylus on the record surface is solely provided by the weight of the carriage and cartridge.

At the end of the playing period, the carriage, urged by the record groove, operates a switch 35, by which a cycle of events is initiated, to be described in detail later. The arm is lifted, pivoting about axis 36, and the cartridge carriage rolls along the arm under the force of gravity to return to a starting position determined by the position of switch 37.

It will be seen that the pickup arm does not swing horizontally, but rather vertically, and that during the playing of the record it remains stationary. Consequently adjacent pickup arms operated with the same record may be spaced as closely as the width of an arm will permit, the latter dimension being determined primarily by the size of cartridge used. The motion of the carriage is essentially radially of the record, and the cartridge is oriented to operate with the modulation of the record groove deflecting the stylus laterally, i. e., radially. During the playing period the sides of the record grooves are loaded only slightly as necessary to urge the carriage along the ways without any loading by the arm. Furthermore, by orienting the length of the ways so that the carriage in moving radially inwards experiences a small displacement in the direction of motion of the record surface, the least loading on the record grooves may be achieved. It will be appreciated that by reducing wear on the grooves to a minimum, the useful life of the record is lengthened and the maintenance is simplified.

The electrical signal output of the pickup head is carried by a set of conductors 38 to external correcting and amplifying means (not shown), and provision is made for the displacement of the carriage by suitably coiling or folding the conductors, as at 39. By choosing suitable sizes of stranded conductor and an insulation which is sufficiently flexible, a degree of elasticity and freedom from set may be realized whereby the conductors will keep clear of the head without imposing excessive tension in their most extended position.

The support for the pickup arm comprises a simple sheet metal structure of suitable gauge, having two vertical brackets or lugs 40 formed from the sheet, and a base portion 41 adapted to be secured to the plate 13 as by bolting or riveting. The construction may be studied by referring also to Figure 6. A tongue member 42 extending towards the turntable is parallel with the plate 13. Secured to the lower side of the pickup arm is a cam strip 43 fixed at the pivot end by bolt 44, and adjustably fixed at the end nearest the turntable by screw 45. A set of balls 46 held in a cage and actuated by link 47 ride on the upper surface of tongue 42, and engage the cam strip. In the position illustrated the pickup arm is held in the lowered position, adjustment of screw 45 serving to align the parallelism of the ways 33 with the record surface. Link 47 is guided at the outer end by a pierced lug 48 bent up from the base.

The raising or lowering operation is carried out by actuating link 47 from friction wheel 49 to which the inner end of the link is pinned by bearing 50. In its normal position wheel 49 is at rest, but may be brought into frictional engagement with cylinder 15 by a kick from solenoid plunger 51 against projection 52. Wheel 49 has two stable or rest positions, 180 degrees apart, hence its actuation alternately leaves the set of balls 46 at the inner or outer positions, corresponding to lowered or raised positions of the pickup arm. In either position, the surface of the cam strip at the point of contact with the ball is tangent with the surface of tongue 42, so that the weight of the pickup arm introduces no component tending to shift the position of the balls.

Solenoid 53 is equipped with a restoring spring to return plunger 52 to its retracted position when energisation is removed.

By referring now to Figures 3, 4, and 5, in addition to Figure 1, the operation of the friction wheel may be understood in greater detail. These figures illustrate the steps in a cycle of operations bringing about the raising of the pickup arm. Cylinder 15, rotating with the turntable, carries on its surface a suitable friction material such as vulcanized rubber, or it may be metal with a milled surface. Friction wheel 49 rotates about a fixed axis in bearing system 54, supported by column 55 from base plate 13. Its inner portion may be of metal, fibre, hard rubber or the like substances, while its peripheral portion comprises a soft, resilient friction material. A soft yet rough rubber material is preferable for this purpose, though a wide group of elastomers might be employed. Two cutaway portions, designated by reference numerals 56, are located at 180 degree positions about the circumference of the wheel. In Figure 3, there is no frictional contact, therefore wheel 49 remains at rest. In Figure 4, plunger 51 has pushed projection 52 which is set into the wheel, thereby giving the wheel an initial rotation, sufficient to bring the wheel rim into engagement with cylinder 15, whereupon wheel 49 is caused to be driven. During the driving action the rim of wheel 49 is squeezed at the area of contact, thus ensuring a positive frictional engagement. Link 47 is carried about to the alternative rest position of Figure 5, while the friction wheel clears itself from cylinder 15 by presenting the portion 56 to the latter. It is to be understood that the cam and ball set co-operate in these rest positions by providing stable, unloaded conditions for link 47, as has been referred to previously, on completion of the action in Figure 5, the link member has raised the pickup arm, and another projection 52 diametrically opposite the first such projection discussed is now in position to be actuated by the plunger to initiate the lowering operation.

While a cam strip has been illustrated as a preferred form of arm-actuating mechanism, other devices may be employed, using the link member 47 driven by a friction wheel. In Figure 7 the cam 57 is integral with the link member 47, sliding along the surface of tongue 42. A wheel 58 is rotatable about a shaft carried in the pickup arm. In the lowered position, the wheel rests in depression 59 of the cam to provide a stable rest position. Similarly, in the raised position, the cam is flattened to provide the unloaded, stable condition required for the link.

In Figure 8 a pivoting strut 60 is supported at its lower end on a shaft of rolling wheel 61 journalled in the link 47. Its upper end is pivoted on a pin held in the pickup arm. In the raised position, the strut is vertical, and the weight of the arm exerts a force on wheel 61 tending to hold link member 47 in a stable position of rest. In the lowered position, link 47 moves inwardly, carrying the strut to the position indicated by dotted lines and setting the point of adjusting screw 63 on the stop 62.

The lowering action of a pickup arm according to the invention may be performed at any speed consistent with the strength of materials used, and provided that the stylus approach velocity with respect to the record surface at the moment of contact is not so high as to damage the record. If a resilient stylus mount is used with the cartridge, then it is less important to so shape the cams or actuating devices as to produce slow terminal velocity. One form of cartridge support is shown in Figure 9, wherein a carriage 34 rolls on ways 33 of the pickup arm, the cartridge being supported by screw or other fastening 64 from the flat portion of the carriage. It is advantageous moreover to cushion the cartridge in suitable damping material to isolate vibrations from affecting a reproduction. Balls 66 ride in sockets 68 formed in the lower ends of the carriage member, the length of the carriage being greater than the length of a cartridge as appears in Figure 1. Enough clearance is provided for the balls in the sockets so that free rotation of the balls may be ensured. While lubricant may be used, it has not been found necessary when polished sockets and ways are provided. The cartridge may be held so that the stylus has a position about midway between the ways. Sufficient clearance between the sides of the pickup arm 31 and the sides 65 of carriage 34 is provided to permit of free up and down movement of the latter, and to allow a slight amount of tilt across the ways when in the lowered position.

As will be seen from Figures 1 and 11, the pickup arm is cut away between the ways along a portion of its length to allow the pickup cartridge to protrude beneath.

Figure 2:
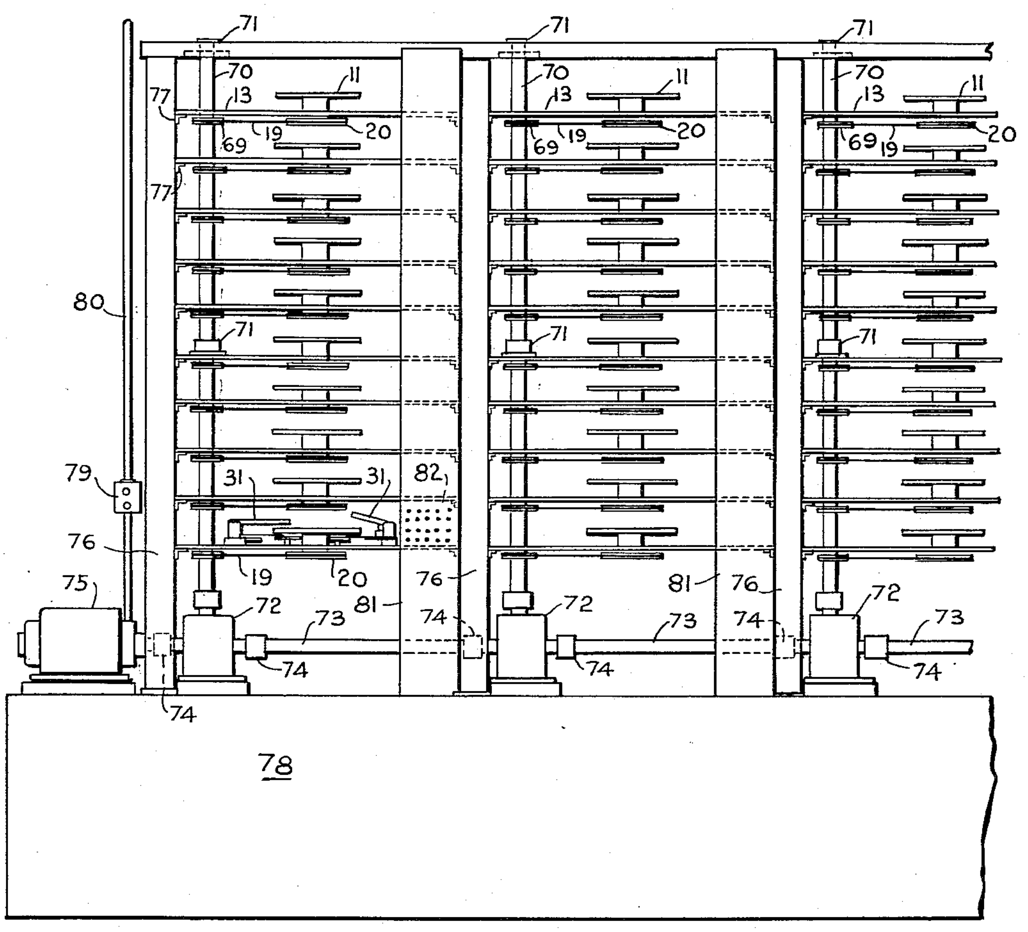
Figure 2 is an elevation view from the front of part of a line of bays accommodating a number of vertically stacked turntables, showing power drive means for an installation which may operate several hundred turntables.

A number of turntables with one or more pickup arms associated therewith may be arranged to be driven from a common power unit, as will now be described with respect to Figure 2. The apparatus of Figure 1 may be repeated as a vertical arrangement or stack of turntables 11 supported on respective base plates 13 with pulley drive, a corresponding number of drive pulleys 69 being aligned with driven pulleys 20 and connected thereto by belts 19. Each drive pulley 69 is centered on a vertical drive shaft 70 steadied at intervals by bearings 71. Power to the drive shaft is imparted at a speed appropriate to the type of record being used on the turntable, by speed reducers 72 providing drive at right angles to the input drive shaft. A series of similar speed reducing units may be connected in line by sections of shaft 73 and couplings 74, to serve a considerable number of bays or stacks from a single constant speed driving motor 75. In the arrangement shown in the figure, a line of similar stacks is constructed as a framework 76 of steel sections, to which supporting angles 77 are fixed, these supporting the decks or plates 13. Sufficient space is provided between decks to permit the pickup arms to be elevated to their raised positions, and to allow of removal of a record. While numerous arrangements may be conceived, a distance of four to five inches between decks has been found satisfactory without maintenance attention difficult. A stack of ten tables therefore may be accommodated within the height range between 75 inches and 30 inches from a floor, which offers the greatest convenience to maintenance staff.

A pier or other rigid foundation 78 is provided for the purpose of raising all mechanism to a convenient height, and to ensure stability of long line shafts, to reduce transmitted vibrations, besides generally securing advantages in erection as will be apparent to those versed in the art. Each line of stacks may have a separate drive motor 75, controlled by a stop-start and overload protection device 79, through which power from an electrical main is brought by conduit 80.

Associated with each stack of turntables and pickup arms along the side of the stack is a local control and monitor panel 81, having areas such as 82 allocated to the supervision of the operations of one turntable and its associated arms. Reference will now be made also to Figure 10, wherein circuitry illustrative of the control and supervisory facilities is described, for one pickup arm. A main control center is generally indicated at 83, comprising a switchboard at which the output terminals of an amplifier 84 terminate in a jack. The pickup 32 is connected to the amplifier, which may incorporate corrective networks for equalizing frequency response of the record and pickup. When a request for the reproduction of a given recorded performance has been received from a patron's station, the line outgoing thereto being indicated by cord terminals 85, the operator engages the cord plug in the jack, it being understood that this particular pickup arm is free. Indicator lamp 87 is dark, indicating that switch 37 is open, corresponding to the raised condition of the pickup arm. When button 88 is pressed, the solenoid 53 is energized, driving plunger 52 outwards, and initiating the lowering operation. The push button is actuated only momentarily. When the arm is lowered, indicators 86 and 87 both light, the latter being located at the local control area 82. When the pickup carriage comes to the position where it closes switch 35, solenoid 53 is again actuated, this time initiating the cycle which raises the pickup arm. On completion of this step lamps 86 and 87 are dark, and the cord 85 may be removed. The particular pickup arm is thereby freed for use in answering another patron's request.

It will be appreciated that regardless to the means used for requesting a reproduction of a recorded performance, or of the further handling of the signal going out from cord 85, the apparatus according to the invention provides for the automatic termination of a reproduction and provides a signal indicative of the state of the pickup arm, i. e., whether raised or lowered.

At such time as a record requires to be replaced, local control of the raising and lowering of any arms is provided by a push button 90 at area 82.

Figure 11 shows one of several possible arrangements of pickup arms for operation with a single record disc. The illustration shows six arms, A, B, C, D, E, and F along an arc about the turntable axis, and the arrangement of upper and lower friction wheels 49 or 49' serving each arm. The system depicted concerns the 45 R. P. M. type of record, and provides a cycle speed (raising or lowering) of approximately 0.8 second. Arm F is removed to show the operating mechanism in playing position.

To facilitate removal or replacement of record discs, the base plate 13 may advantageously be cut away in an arc at the front.

In order to accommodate closely-spaced friction wheels, these are placed at different levels, alternate wheels being at the same level, as shown in Figure 12. Wheel 49 is shown occupying the upper position, while a similar wheel 49' in the adjacent position at either side is set at a lower level, determined by the height of column 55. In order to allow the use of identical pickup arm mountings, link member 47' operated by lower friction wheels is offset by a double bend as at 91 and 91', to bring it to the same level as link 47 shown in Figure 13.

It will be appreciated that separate mechanisms will be required for different numbers of pickup arms with different sizes of records. Nevertheless, the practice of the invention may be extended directly to any size or type of disc recording. In Figure 14 a drive cylinder 15' of considerably larger diameter in proportion to friction wheels 49, 49' is shown, this arrangement permitting as many as eleven pickup arms to be operated within an arc which still allows a disc to be removed from the front of the assembly. Particularly if 78 R. P. M. discs are used, speed reduction may advantageously be provided for the cylinder 15', for example, by interposing the planetary drive friction wheel 92 between the primary drive cylinder 15' and the outer drive cylinder 15;

The scope of the invention is to be understood as not necessarily limited to the arrangements described, and in particular the maximum number of pickup arms which may be employed with a single disc may be extended upwards, limited only by the physical dimensions of the pickup cartridges utilized.

I claim:

1. Apparatus of the character described comprising a rotatable turntable, a mounting in the plane of said turntable adjacent the periphery thereof, a pickup arm pivotally supported by said mounting in a plane normal to the plane of said turntable for vertical swinging movement towards and from said turntable, a pickup carriage mounted for longitudinal movement of said pickup arm, a friction cylinder driven by said turntable, a friction wheel rotatably mounted adjacent said cylinder for driving engagement with the cylinder, said wheel having opposed sectors in non-driving relation to said cylinder, a crank arm connected to said friction wheel having its free end slidably mounted on said mounting beneath said pickup arm, means between the free end of said crank arm and said pickup arm for raising and lowering said pickup arm upon reciprocation of said crank arm, a solenoid having a reciprocating plunger for striking said friction wheel to move said wheel into driving engagement with said cylinder, an electric circuit for said solenoid, and a switch interposed in said circuit for controlling the energizing of said solenoid operable by the movement of said pickup carriage.

2. Apparatus of the character described in claim 1 wherein the means for raising and lowering said pickup arm includes a cam surface on the underside thereof, and means carried by said crank arm in moving engagement with said cam surface.

3. Apparatus of the character described comprising a rotatable turntable, mountings disposed adjacent the periphery of said turntable, a series of pickup arms pivotally mounted on said mountings in spaced angular relation above said turntable adapted to swing vertically towards and from the turntable, pickup carriages slidably mounted on said arms for longitudinal movement thereof, a friction cylinder driven by said turntable, a series of friction wheels mounted for driving engagement with said cylinder having opposed sectors in non-driving relation to the cylinder, crank arms connected to said friction wheels having their free ends slidably mounted beneath said pickup arms, means between the free ends of said crank arms and said pickup arms for raising and lowering said pick-up arms upon reciprocation of said crank arms, solenoids having reciprocating plungers for selectively imparting movement to said friction wheels to move said wheels into driving engagement with said cylinder and electric circuits for controlling said solenoids having control means operated by the movement of said pickup carriage.

References Cited in the file of this patent

UNITED STATES PATENTS

| | | |
|---|---|---|
| 1,811,003 | Eftihios | June 23, 1931 |
| 2,428,258 | Alexandersson et al. | Sept. 30, 1947 |
| 2,527,586 | Small | Oct. 31, 1950 |
| 2,640,700 | Mortimer et al. | June 2, 1953 |